(No Model.)

O. L. CADY.
MEAT TENDERER.

No. 454,330. Patented June 16, 1891.

Witnesses
Wm. S. Hodges
D. A. Millrick

Inventor
O. L. Cady
By
Patrick O'Farrell
Attorney

UNITED STATES PATENT OFFICE.

OSCAR L. CADY, OF LINCOLN, NEBRASKA.

MEAT-TENDERER.

SPECIFICATION forming part of Letters Patent No. 454,330, dated June 16, 1891.

Application filed April 1, 1891. Serial No. 387,234. (No model.)

*To all whom it may concern:*

Be it known that I, OSCAR L. CADY, a citizen of the United States of America, residing at Lincoln, in the county of Lancaster and State of Nebraska, have invented certain new and useful Improvements in Meat-Tenderers, of which the following is a specification, reference being had therein to the accompanying drawings.

This invention relates to a new and improved meat-tenderer, having for its object, primarily, to produce a tendering-roll which shall be effective in operation and simple in construction, and also the provision of a stand or frame by which the roll will be held down to its work without exertion on the part of the operator.

The invention comprises a tendering-roll having series of teeth and knives, the latter being limited in their movement, so as not to cut or tear the meat to too great an extent.

The invention further comprises a stand or board having parallel guide-rods, and a tendering-roll having its ends projected beneath said rods, whereby said roll is held down to its work.

The invention further comprises the detail construction, combination, and arrangement of parts, substantially as hereinafter fully set forth, and particularly pointed out in the claims.

Figure 1:
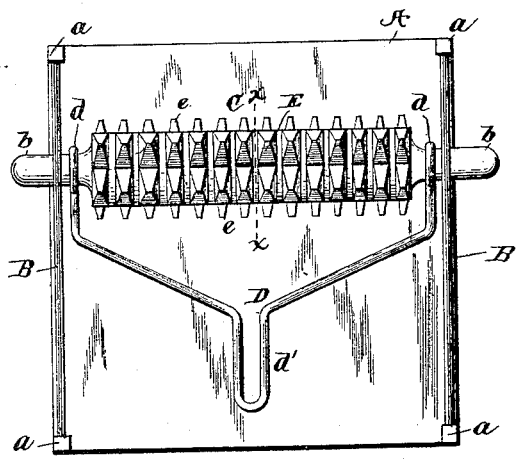
Figure 2:
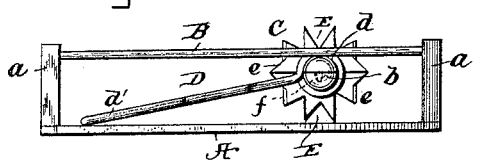
Figure 3:
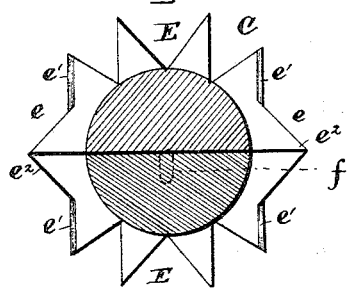
Figure 4:
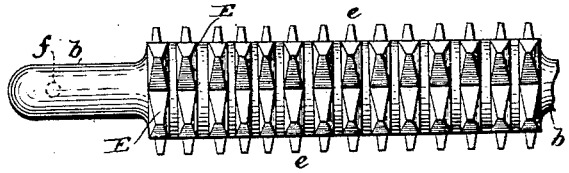

In the accompanying drawings, Figure 1 is a plan view illustrative of my invention. Fig. 2 is a view in side elevation. Fig. 3 is a transverse sectional view of the tendering-roll, taken on the line $x\ x$, Fig. 1. Fig. 4 is a plan view of said roll.

Referring to the drawings, A designates a board or frame, preferably flat on its upper surface and provided at each corner with a short vertical post $a$, having a hole or aperture formed in its upper end.

B B designate two parallel rods at the longitudinal sides of board A, and connected at their ends to posts $a$ by being passed through the holes thereof.

C is the tendering-roll, provided with reduced ends $b$, designed to project beneath the parallel rods B, which latter serve to hold the roll down in contact with the upper surface of the base-board. To these reduced ends of the roll are secured the ends of an operating-handle D. This handle is preferably of U shape and made from one stiff piece of wire, the ends of which are bent to form eyes $d$, which loosely fit over the reduced ends of the roll. This wire at its center is formed into an extension $d'$, which is grasped by the operator. By means of the handle D the roll C can be readily and easily moved over the base-board. This tendering-roll is provided at its central circular portion with four rows or series of pointed teeth E, two of which rows are at diametrically-opposite points. From the roll also project two sets of opposite knives $e$. Each knife has two cutting-edges $e'$, between which is a central short tooth $e^2$, having a dull or blunted end. The object of this peculiar arrangement is that by my invention it is not desired to tear or mangle the meat, but only to tender the same by puncturing it. The pointed teeth will readily project into the meat, and the knives will serve to slightly cut the same, but are prevented from making the cut extend entirely through the meat by reason of the blunted teeth thereon. The roll is preferably made in two parts or sections, so as to permit of the ready cleansing thereof. The sections are held together by two lugs $f$ of one section projecting into holes or apertures of the other section.

A meat-tenderer constructed as herein described is extremely simple, cheap, and durable and is most effective in operation.

I claim as my invention—

1. A meat-tendering roll having series of pointed teeth and knives projecting therefrom, said knives being limited in their cutting depth, as set forth.

2. A meat-tendering roll having a series of knives projecting therefrom, each of said knives having two cutting-edges and a central blunted tooth, as and for the purpose set forth.

3. The herein-described meat-tendering roll, having a series of pointed teeth projecting therefrom, and two series of knives, each of which knives is provided with a blunted tooth, substantially as and for the purpose set forth.

4. The herein-described meat-tendering roll, having series of teeth and knives and formed in two parts or sections, as set forth.

5. The herein-described improved meat-tenderer, consisting of the frame having parallel rods, and the tendering-roller having reduced ends extended beneath said rods, substantially as and for the purpose set forth.

In testimony whereof I affix my signature in presence of two witnesses.

OSCAR L. CADY.

Witnesses:
D. L. LOVE,
J. L. TEETERS.